Sept. 12, 1967             F. PIETRO             3,340,741
POWER TAKE-OFF CONNECTION TO BE MOUNTED ON THE DRIVING
SHAFT OF INTERNAL COMBUSTION ENGINES
Filed June 29, 1965
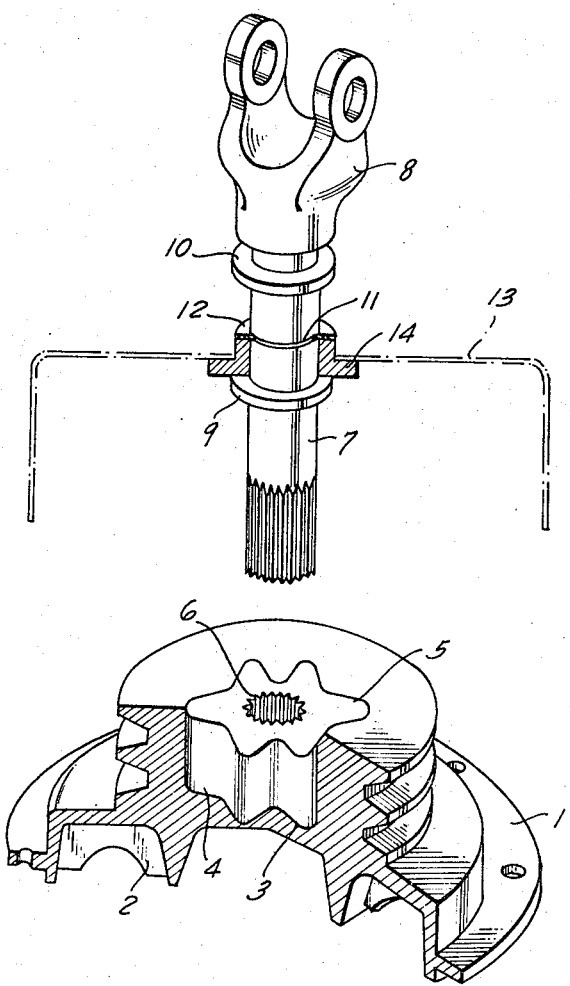
INVENTOR
Pietro Fontanetta
BY
ATTORNEY

# United States Patent Office 3,340,741
Patented Sept. 12, 1967

3,340,741
POWER TAKE-OFF CONNECTION TO BE MOUNTED ON THE DRIVING SHAFT OF INTERNAL COMBUSTION ENGINES
Fontanella Pietro, Corso Vittorio Emanuele 74, Michelangelo BOVI, Turin, Italy
Filed June 29, 1965, Ser. No. 467,981
Claims priority, application Italy, May 18, 1965, 11,390/65
9 Claims. (Cl. 74—15.63)

This invention relates to a power take-off connection to be mounted on the driving shaft of an internal combustion engine. Many engine types have a driving shaft protruding from a baseplate at the end opposed to a transmission, said shaft having a pulley engaging a drive belt for driving either a generator or a fan. Other engine types have a pulley provided on the inner side thereof with either a fan or a surface forming an oil filter separator.

According to the present invention, the pulley forming part of the power take-off connection is provided at one end thereof with a flange adapted to be connected to the drive shaft and in a cylindrical portion projecting from the flange with one or more grooves and in said cylindrical portion with a central cavity to receive a flexible coupling having an axial socket provided with a toothed hole in which a correspondingly toothed end portion of a shaft slidably mounted on a column or crossbeam of the engine mounted on the vehicle frame or body is adapted to engage, said shaft having at its end a universal joint and forming the power take-off connection.

This shaft has two stops for being locked in one of its axial positions of engagement (engaged and released).

Other details and advantages will be best understood from the enclosed drawings and following specification to which reference is made only by way of a non-limiting example.

The single figure shows partly in section a power take-off connection which comprises a separator cover of an oil filter having a pulley provided with two grooves, particularly fit for being coupled with a pump unit (not shown), and having at the center a flexible coupling for a shaft forming the power take-off connection.

Referring to this drawing, 1 is the cover to be fitted on the centrifugal filter body (not shown) by means of studs, 2 are blades, 3 is a seat centrally toothed at 4 in which is mounted the flexible coupling 5 having a central bore 6 provided with axially extending and radially inwardly projecting teeth or ridges adapted to engage with corresponding teeth on the end portion of a shaft 7 having at its opposite end a crosshead 8 for a universal joint.

Shaft 7 has two axially spaced stop rims 9 and 10, respectively, and a groove 11 to receive an expansion washer 12 for axially locking the shaft in its released position. 13 is a schematic illustration of a member mounted on the vehicle frame or body and provided with a support 14 for guiding the shaft.

It should be understood that the here described and illustrated device can be variously modified without departing from the invention scope, for instance the pulley can be mounted directly on the driving shaft, and the shaft forming the power take-off connection otherwise fixed to the vehicle and provided with different engagement means.

I claim:
1. A power take-off connection comprising, in combination, pulley means adapted to be connected at one end thereof to a drive shaft, said pulley means being formed with a central cavity extending from the other end thereof in axial direction in said pulley means; an annular insert of flexible material located in said cavity and connected to said pulley means for rotation therewith, said insert being formed at the inner peripheral surface thereof with circumferentially spaced, axially extending and radially inwardly projecting ridges; driven shaft means axially aligned with said pulley means and having an end portion formed with ridges corresponding to those on said insert; and mounting means mounting said driven shaft means movable in axial direction between an engaged position in which said ridges on said end portion thereof engage the ridges of said insert and a disengaged position.

2. A power take-off connection as defined in claim 1, wherein said pulley means is provided with a plurality of teeth extending angularly displaced from each other into said cavity, and wherein said insert is provided at the outer peripheral surface thereof with corresponding cutouts in which said teeth fit.

3. A power take-off connection as defined in claim 1, wherein said pulley means includes at said one end thereof an annular flange for connecting said pulley means to a drive shaft.

4. A power take-off connection as defined in claim 3, wherein said annular flange is provided in the region of the outer periphery thereof with a plurality of bores extending angularly spaced from each other in axial direction through said flange.

5. A power take-off connection as defined in claim 4, wherein said pulley means is formed at said one end thereof with an annular channel and including a plurality of fan blades in said annular channel.

6. A power take-off connection as defined in claim 1, wherein said mounting means includes a bushing slidably guiding said driven shaft on a portion thereof axially spaced from said end portion.

7. A power take-off connection as defined in claim 6, and including a pair of stop rims fixed to said driven shaft axially spaced from each other and respectively arranged to opposite sides of said bushing.

8. A power take-off connection as defined in claim 7, and including an annular groove formed in said driven shaft between said stop rims, and means engageable in said groove for maintaining said driven shaft in one of the positions thereof.

9. A power take-off connection as defined in claim 8, and including a cross head fixed to the end of said driven shaft opposite said end portion thereof.

References Cited

UNITED STATES PATENTS 2,564,932   8/1951   Smith _____ 74—15.63
3,066,503   12/1962  Fleming et al. _____ 64—27

FOREIGN PATENTS 1,284,426   1/1962   France.

MILTON KAUFMAN, Primary Examiner.